United States Patent [19]
Eskelinen

[11] Patent Number: 6,068,272
[45] Date of Patent: May 30, 2000

[54] CARRIAGE FOR TRANSPORTING AND STORING DOCTOR BLADES

[75] Inventor: Iikka Eskelinen, Varkaus, Finland

[73] Assignee: Valmet Corporation, Helsinki, Finland

[21] Appl. No.: 09/099,497

[22] Filed: Jun. 18, 1998

[30] Foreign Application Priority Data

Dec. 16, 1997 [FI] Finland ................................ 970563 U

[51] Int. Cl.[7] ................................ B62B 7/00; B62B 1/00

[52] U.S. Cl. .................................... 280/47.34; 280/47.26; 280/47.19

[58] Field of Search .............................. 280/47.26, 47.19, 280/47.34, 47.35, 79.3, 651

[56] References Cited

U.S. PATENT DOCUMENTS

| | | | |
|---|---|---|---|
| 2,905,480 | 9/1959 | Giovanelli | 280/47.19 |
| 4,670,227 | 6/1987 | Smith | 422/297 |
| 4,998,743 | 3/1991 | Thielen | 280/47.19 |
| 5,069,466 | 12/1991 | Propst | 280/79.3 |

*Primary Examiner*—Paul N. Dickson
*Assistant Examiner*—Fayz M. Fleming
*Attorney, Agent, or Firm*—Steinberg & Raskin, P.C.

[57] ABSTRACT

A carriage for transporting and storing doctor blades including a frame and wheels at a bottom of the frame. The carriage is movable on support of the wheels into different positions throughout the paper machine. Storage boxes for doctor blades are arranged in an interior spare of the carriage. In use, the doctor blades are discharged from the storage boxes. The carriage also includes a cover which can be opened and closed to access the interior space.

21 Claims, 2 Drawing Sheets

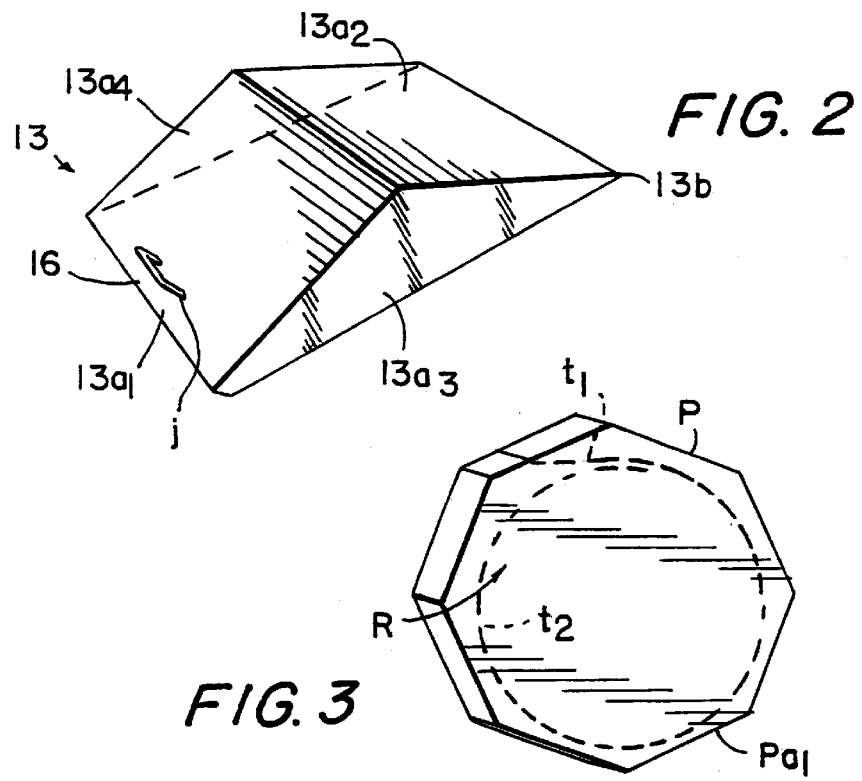
FIG. 2
FIG. 3
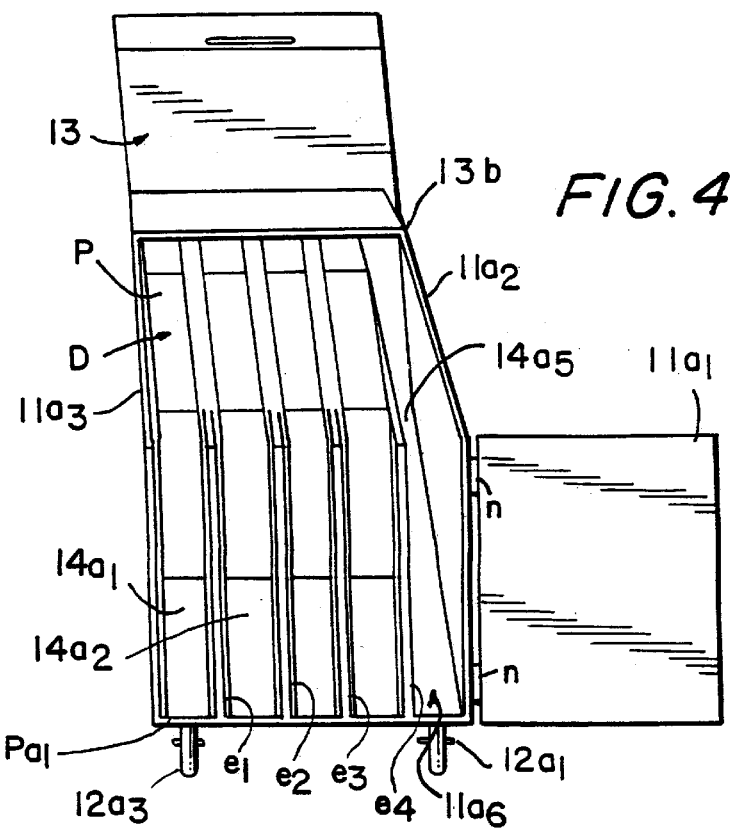
FIG. 4

CARRIAGE FOR TRANSPORTING AND STORING DOCTOR BLADES

FIELD OF THE INVENTION

The present invention relates to a carriage for transporting and storing doctor blades.

BACKGROUND OF THE INVENTION

Conventionally, doctor blades are kept and stored in paper mills on long shelves. In such a case, there is a risk that their blade edges are damaged because the doctor blades may become exposed and unprotected.

OBJECTS AND SUMMARY OF THE INVENTION

It is an object of the present invention to provide a carriage for transporting and storing doctor blades.

It is another object of the present invention to provide an apparatus for transporting and storing doctor blades while preventing contamination and damage to the doctor blades.

In order to achieve these objects and others, in accordance with the invention, doctor blades are arranged in storage boxes and the storage boxes are arranged in the separate carriage which includes compartments for doctor blades of different types. The carriage is provided with wheels, or other comparable displacement systems, so that it can be readily moved in the paper mill to different positions of the paper machine.

In accordance with a preferred embodiment of the present invention, the carriage comprises a movable cover which can be opened and closed. The cover is preferably made of a transparent material so that the storage boxes placed in the carriage and the labels on the boxes can be seen through the cover. When the carriage is provided with a cover that can be opened and closed, contamination of and damage to the doctor blade storage boxes, which are made of cardboard, and the doctor blades contained in the boxes are prevented. The cover can also be locked by suitable locking means in order to ensure that only authorized persons have access to the doctor blades. In connection with the top cover of the carriage, there are preferably index labels indicating the compartments in the carriage, and the different compartments contain doctor blades of different widths different lengths made of different materials.

Thus, a carriage for transporting and storing doctor blades in accordance with the invention comprises a frame defining an interior space, wheels arranged on the frame for enabling movement of the frame, at least one doctor blade storage box for storing a respective doctor blade and which is arranged in the interior space of the frame, and a cover movably as mounted to the frame for movement between a closed position in which access to the interior space is prevented and an open position in which access to the interior space is permitted. The cover may be hingedly mounted to the frame such as by hinge means including a hinge shaft about which the cover is pivotable. The cover may be made of a transparent and/or plastic material. The cover comprises a first planar portion, a second planar portion placed at an oblique angle in relation to the first planar portion, and lateral portions alongside the first and second planar portions. The first planar portion overlies an opening defined in the frame.

The frame may comprises a bottom wall, a top wall and side wall extending between the bottom wall and the top wall, the wheels being mounted to the bottom wall. The interior space is defined by the bottom wall, the top wall and the side walls. The first planar portion of the cover extending substantially planar to the top wall and a second planar portion extends at an angle to the first planar portion and at an angle to one of the side walls. The lateral portions of the cover extend over opposed side walls of the frame.

The invention will be described in detail with reference to some preferred embodiments of the invention illustrated in the figures in the accompanying drawings. However, the invention is not confined to the illustrated embodiments alone.

BRIEF DESCRIPTION OF THE DRAWINGS

Additional objects of the invention will be apparent from the following description of the preferred embodiment thereof taken in conjunction with the accompanying non-limiting drawings, in which:

FIG. 2 is a separate illustration of a cover of the carriage of FIG. 1 which can be opened and closed;

FIG. 3 illustrates a storage box for a roll of doctor blades to be arranged in the carriage of FIG. 1; and FIG. 4 illustrates the carriage of FIG. 1 viewed from the front with the cover and the front wall of the frame opened.

DETAILED DESCRIPTION OF THE PREFERRED EMBODIMENTS

Figure 1:
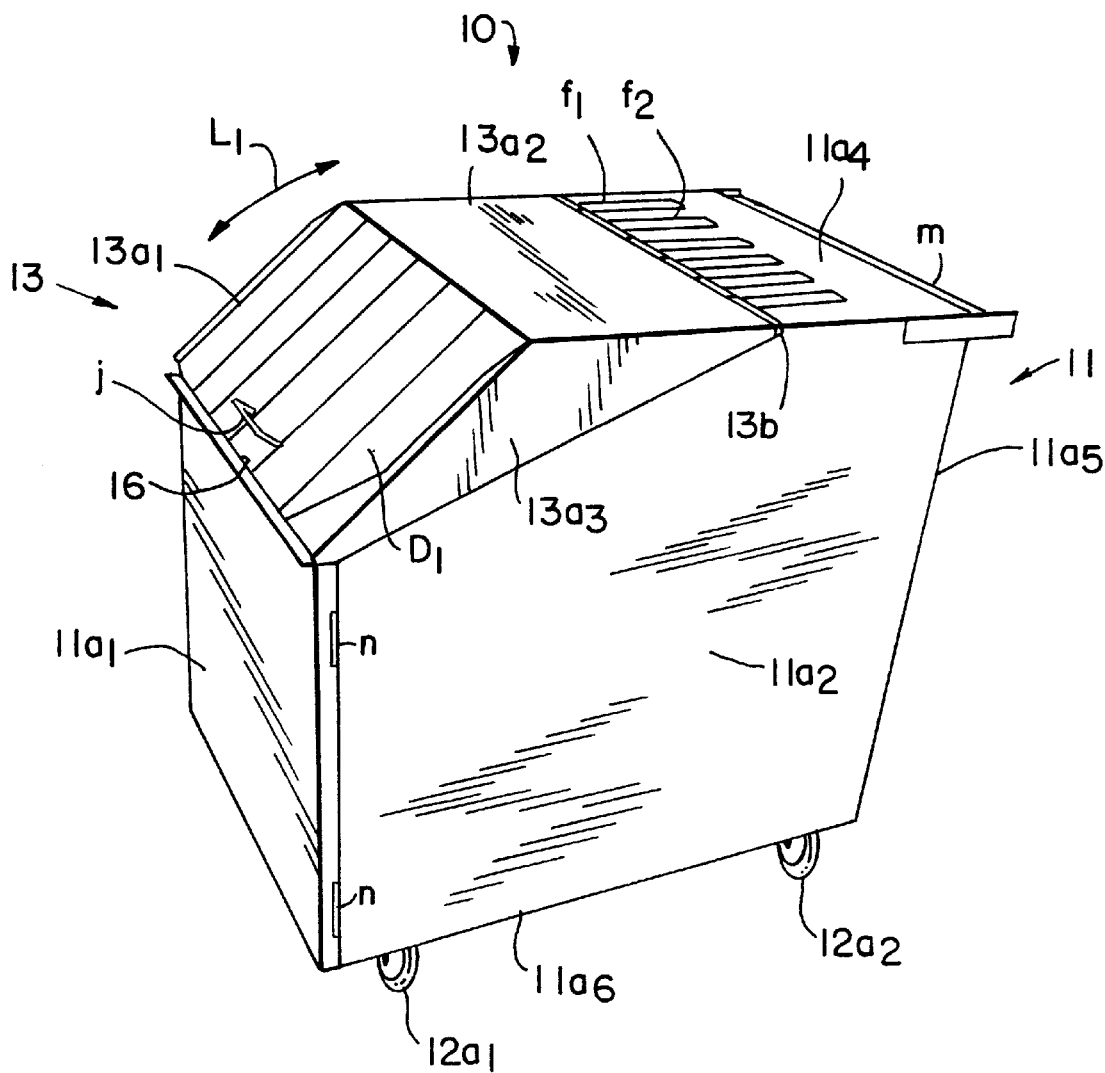
FIG. 1 is a perspective view of a carriage in accordance with the invention for receiving storage boxes for doctor blades.

Referring to the drawings wherein corresponding reference numerals refer to the same or similar elements, FIG. 1 is a perspective view of a carriage in accordance with the invention designated generally as 10. The carriage 10 comprises a frame 11 having walls or plates $11a_1, 11a_2, \ldots, 11a_6$ and in connection with the bottom wall $11a_5$, wheels $12a_1$, $12a_2$, $12a_3$ and $12a_4$ are mounted. The walls $11a_1$, $11a_2$ . . . , $11a_6$ define an interior space D for receiving one or more doctor blade boxes P while maintaining an opening. In view of the presence of the wheels $12a_1$, $12a_2$, $12a_3$ and $12a_4$, the carriage 10 can be moved readily into different locations throughout a paper machine hall.

The carriage 10 also comprises a movable cover 13 coupled to the frame 11 in a position over the opening and which can be opened and closed. Cover 13 is preferably made of a transparent material, preferably a plastic material. The cover 13 comprises locking means 16 at its front edge which enable the cover 13 to be lock in engagement with the frame 11, whereby it can be ensured that only authorized persons can open the cover 13. To provide for rotation relative to the frame 11, cover 13 also comprises a hinge shaft 13b at its forward edge adjacent top wall $11a_4$ of the frame 11 and the locking means 16 are arranged at the rearward edge opposite to the hinge shaft 13b adjacent side wall $11a_1$. The cover 13 further comprises a first substantially planar portion $13a_1$ adjoining the rearward edge at which the locking means 16 are arranged and a second planar portion $13a_2$ adjoining the forward edge at which the hinge shaft 13b is arranged. First planar portion $13a_1$ is arranged obliquely in relation to the second planar portion $13a_2$. Cover 13 also comprises triangle-shaped lateral portions $13a_3$ and $13a_4$, which are placed along the side walls $11a_2$, $11a_3$ of the frame part of the carriage 10 when the cover 13 is closed. The pivoting movement of the cover 13 about hinge shaft 13b is denoted by arrow $L_1$.

The interior space D is partitioned into several compartments $14a_1, 14a_2, \ldots$ Each compartment $14a_1, 14a_2 \ldots$ in the carriage 10 is provided with index labels for the different storage box to be placed therein by providing the compartment with a separate symbol or index $f_1$, $f_2$, . . . in the vicinity of the hinge shaft 13b of the openable cover 13 at the top wall $11a_4$ of the carriage frame 11. The carriage 10 also includes a handle m connected to one or more of the walls $11a_1$, $11a_2$, . . . , $11a_6$ and by whose means the carriage 10 can be moved.

FIG. 2 is a separate illustration of the cover 13, which can be selectively opened and closed. The cover 13, or at least planar portion $13a_1$ thereof, is made of transparent plastic and comprises the hinge shaft 13b at its forward edge and the locking means 16 at the opposite edge. The locking means 16 may be any type of locking device. The cover 13 includes a lifting handle j mounted on the first planar portion $13a_1$. The hinge shaft 13b may also be placed in a lateral portion $13a_3$ or $13a_4$ in which case, the direction in which the cover rotates would be changed.

FIG. 3 shows a storage box P for doctor blades, which box is preferably an octagonal box, which can be arranged in the compartments $14a_1$, $14a_2$ . . . , in the carriage 10. The doctor blades $t_1$, $t_2$ . . . can be discharged from the interior of the storage box P from a roll R formed by the doctor blades $t_1$, $t_2$ . . .

As shown in FIG. 4, each storage box P stands in the interior space D of the carriage 10 on the bottom wall $11a_6$ of the frame, i.e., one of the edge planes $Pa_1$ of the storage box P lies on the bottom wall $11a_6$. The interior space D of the carriage 10 is provided with partition walls $e_1$, $e_2$ . . . , in which case, the compartments $14a_1$, $14a_2$ . . . are formed between the partition walls $e_1$, $e_2$ . . . , each for receiving a different doctor blade storage box P. As shown in FIG. 4, the front wall $11a_1$ of the carriage 10 frame has been opened. The front wall $11a_1$ is also provided with hinge means n, in which case, the front wall $11a_1$ can be opened when the carriage is being filled with storage boxes P for doctor blades.

When the cover 13 is opened, the blades $t_1$, $t_2$ . . . can be discharged from the respective doctor blade storage box P, which is placed in the respective compartment $14a_1$, $14a_2$ . . . in the carriage. After a blade $t_1$, $t_2$ or $t_3$ . . . has been taken from the roll R and its end been separated from the adjacent other blade, the carriage 10 can be closed by pivoting the cover 13 into the closed position. After this, the cover 13 can also be locked by means of the locking means 16 in relation to the frame 11.

Above, some preferred embodiments of the invention have been described, and it is obvious to a person skilled in the art that numerous modifications can be made to these embodiments within the scope of the inventive idea defined in the accompanying patent claims. As such, the examples provided above are not meant to be exclusive. Many other variations of the present invention would be obvious to those skilled in the art, and are contemplated to be within the scope of the appended claims.

I claim:

1. A carriage for transporting and storing doctor blades for use in a paper mill, comprising:
    a frame defining an interior space having a size sufficient to accommodate at least one doctor blade in a rolled form,
    wheels arranged on said frame for enabling movement of said frame to different locations in the paper mill,
    means for receiving and storing a respective doctor blade in a rolled form, said receiving and storing means being arranged in said interior space of said frame, and
    a cover movably mounted to said frame for movement between a closed position in which access to said intrior space and thus said receiving and storing means is prevented and an open position in which access to said interior space and thus said receiving and storing means is permitted.

2. The carriage of claim 1, wherein said cover is hingedly mounted to said frame.

3. The carriage of claim 1, further comprising hinge means for hingedly connecting said cover to said frame, said hinge means including a hinge shaft about which said cover is pivotable.

4. The carriage of claim 1, wherein said cover is made of a transparent material.

5. The carriage of claim 1, wherein said cover is made of a plastic material.

6. The carriage of claim 1, wherein said cover comprises a first planar portion, a second planar portion placed at an oblique angle in relation to said first planar portion, and lateral portions alongside said first and second planar portions.

7. The carriage of claim 6, wherein said first planar portion overlies an opening defined in said frame and is made of a transparent material.

8. The carriage of claim 1, wherein said cover includes locking means for locking said cover to said frame.

9. The carriage of claim 1, wherein said cover includes a handle for lifting or lowering said cover.

10. The carriage of claim 1, wherein said frame comprises a bottom wall, a top wall and side wall extending between said bottom wall and said top wall, said wheels being mounted to said bottom wall.

11. The carriage of claim 10, wherein said interior space is defined by said bottom wall, said top wall and said side walls, said cover having a first planar portion extending substantially planar to said top wall and a second planar portion extending at an angle to said first planar portion and at an angle to one of said side walls.

12. The carriage of claim 11, wherein said cover further includes lateral portions extending over opposed side walls of said frame.

13. The carriage of claim 10, wherein one of said side walls is hingedly mounted to an adjacent one of said side walls to thereby facilitate access to said interior space.

14. The carriage of claim 1, further comprising a handle attached to said frame.

15. The carriage of claim 1, further comprising partition walls arranged in said interior space for partitioning said interior space into a plurality of compartments, each of said compartments being arranged to receive a respective one of said at least one storage box.

16. The carriage of claim 1, wherein each of said at least one storage box is octagonal shaped.

17. A carriage for transporting and storing doctor blades, comprising:
    a frame defining an interior space,
    wheels arranged on said frame for enabling movement of said frame,
    at least one doctor blade storage box for storing a respective doctor blade, said at least one storage box being arranged in said interior space of said frame, and
    a cover movably mounted to said frame for movement between a closed position in which access to said interior space is prevented and an open position in which access to said interior space is permitted, said cover comprising a first planar portion, a second planar portion placed at an oblique angle in relation to said first planar portion, and lateral portions alongside said first and second planar portions.

18. A carriage for transporting and storing doctor blades, comprising:

a frame comprising a bottom wall, a top wall and side wall extending between said bottom wall and said top wall, an interior space of said frame being defined by said bottom wall, said top wall and said side walls, wheels arranged on said frame for enabling movement of said frame, at least one doctor blade storage box for storing a respective doctor blade, said at least one storage box being arranged in said interior space of said frame, and a cover movably mounted to said frame for movement between a closed position in which access to said interior space is prevented and an open position in which access to said interior space is permitted, said cover having a first planar portion extending substantially planar to said top wall and a second planar portion extending at an angle to said first planar portion and at an angle to one of said side walls.

19. A carriage for transporting and storing doctor blades, comprising:

a frame defining an interior space, said frame comprising a bottom wall, a top wall and side wall extending between said bottom wall and said top wall, one of said side walls being hingedly mounted to an adjacent one of said side walls to thereby facilitate access to said interior space, wheels arranged on said frame for enabling movement of said frame, at least one doctor blade storage box for storing a respective doctor blade, said at least one storage box being arranged in said interior space of said frame, and a cover movably mounted to said frame for movement between a closed position in which access to said interior space is prevented and an open position in which access to said interior space is permitted.

20. A method for transporting and storing doctor blades for use in a paper mill, comprising the steps of:

arranging each of the doctor blades in a respective doctor blade storage box in a rolled form, arranging each of the storage boxes in an interior space of a frame of a carriage, arranging wheels on the frame to enable movement of the carriage to different locations in the paper mill, movably mounting a cover to said frame for movement between a closed position in which access to the interior space and thus the storage boxes is prevented and an open position in which access to the interior space and thus the storage boxes is permitted, and when the frame is moved to a location at which a doctor blade is needed, moving the cover to its open position, removing one of the storage boxes from the interior space of the frame and removing the doctor blade from that storage box.

21. The carriage of claim 1, wherein said receiving and storing means comprises at least one doctor blade storage box structured and arranged to receive and store a respective doctor blade in rolled form.

* * * * *

UNITED STATES PATENT AND TRADEMARK OFFICE
CERTIFICATE OF CORRECTION

PATENT NO. : 6,068,272
DATED : May 30, 2000
INVENTOR(S) : Ilkka Eskelinen

Page 1 of 1

It is certified that error appears in the above-identified patent and that said Letters Patent is hereby corrected as shown below:

Please change inventor's first name from "Iikka" to -- Ilkka --.

Signed and Sealed this

Twenty-fourth Day of July, 2001

Attest:

Attesting Officer

NICHOLAS P. GODICI
*Acting Director of the United States Patent and Trademark Office*